United States Patent Office 3,562,703
Patented Feb. 9, 1971

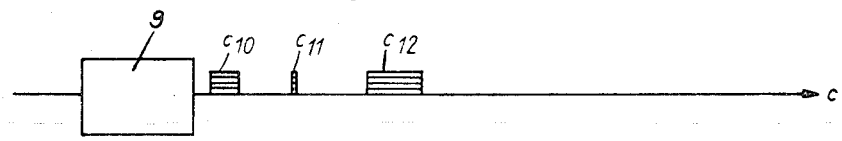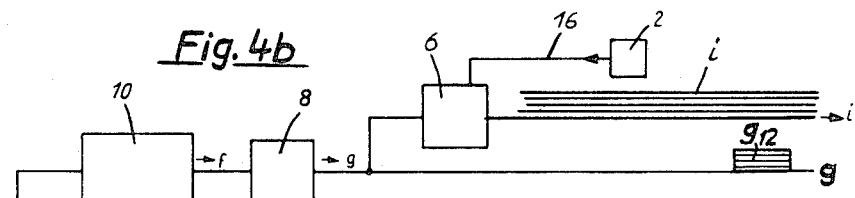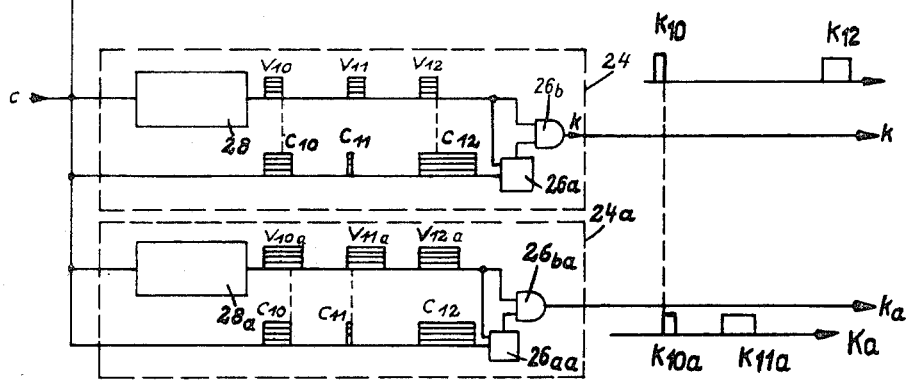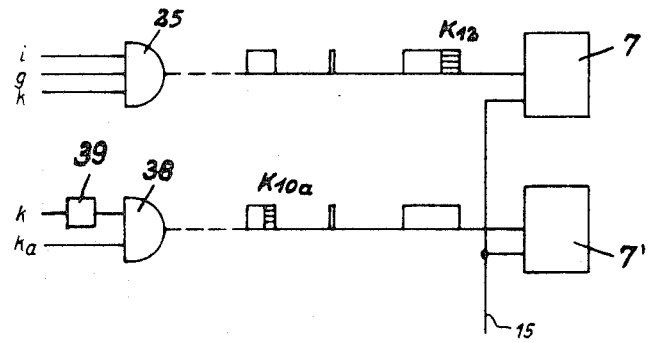

3,562,703
ECHO SOUND PULSE RECEIVING AND
PROCESSING APPARATUS
Walter Grada, Bremen, Germany, assignor to Fried. Krupp
Gesellschaft mit beschrankter Haftung, Essen, Germany
Filed July 23, 1969, Ser. No. 843,996
Claims priority, application Germany, Aug. 3, 1968,
P 17 66 882.5
Int. Cl. G01s 9/68
U.S. Cl. 340—3                                    9 Claims

ABSTRACT OF THE DISCLOSURE

An echo sounding arrangement using both amplitude and width filtering for distinguishing between bottom echoes and echoes from submerged floating objects whose dimensions are less than a predetermined amount.

BACKGROUND OF THE INVENTION

The present invention relates to electronic echo sounding, and particularly to an echo sounder arrangement capable of accurately discriminating between the bottom echo whose range is to be indicated and earlier occurring spurious echoes created by submerged objects of various types.

The invention is, in particular, an improvement on the basic echo sounding device disclosed in U.S. application Ser. No. 767,186, filed on Oct. 14, 1968 by Walter Grada and Wolfgang R. E. Stedtnitz, now Pat. No. 3,504,333. That application discloses an echo sounding apparatus which includes a TVC and/or AVC amplifier, i.e. an amplifier whose amplification automatically increases in proportion to the time elapse since the transmission of a sound pulse in order to compensate for the attenuation of received pulses, the amplifier being connected to a Schmitt trigger followed by a trapezoidal pulse filter whose output controls a zero sound block. The filter is provided with a switch which can give its time constant either one of two selected values and with an amplitude filter that serves to filter out received echo pulses produced by submerged objects. The device further includes a counter mechanism which is arranged to produce an indication of the depth to the bottom of the water body being sounded.

In the arrangement disclosed in the above-mentioned earlier application, the trapezoidal filter is constituted by a low pass filter which effects a pulse length discrimination. The low pass filter acts as an integrating network which produces an indication of the duration of each input pulse thereto in the form of the peak amplitude of the voltage to which the filter capacitors are charged by each such input pulse. While the discrimination of which such circuit is capable is highly accurate and leads to satisfactory operation in most cases, it can nevertheless be deceived in certain situations. In particular, because this device actually provides an indirect indication of the duration of each received pulse, it can occasionally produce an erroneous response on the basis of a reflection from a relatively large submerged object.

SUMMARY OF THE INVENTION

It is a primary object of the present invention to overcome this drawback.

Another object of the invention is to provide a more accurate, direct, detection of the effective duration of each received echo pulse and to cause the system to provide a range indication only on the basis of a received pulse whose effective duration exceeds a predetermined value.

These and other objects according to the invention are achieved by the provision of certain improvements in a device for receiving echo sounding pulses and for providing an indication of the distance to a selected reflecting object. Such device generally includes pulse generator means connected to receive a representation of the received echo signal and to produce, in response to each received echo pulse whose range-corrected amplitude exceeds a predetermined value, a substantially square wave pulse whose duration is substantialy equal to the duration of the received pulse, and counter means for providing an indication of the distance to such object. According to the improvement of the invention, the device further includes pulse width comparison filter means connected to receive such square wave pulses for producing a counter control signal upon receipt of a square wave pulse whose duration bears a predetermined relation to a given reference value.

The present invention is essentially based on the realization that the indirect time measurement of each square wave pulse might advantageously be replaced, or supplemented, by a direct time measurement in order to obviate the inherent shortcomings of an indirect pulse duration measurement by means of an integrating circuit. Such shortcomings particularly exist when the pulse width is evaluated exclusively in terms of the relation between the peak amplitude of each output pulse from the integrating circuit and some preselected amplitude threshold.

To achieve the desired improvement, the present invention provides an additional filter which directly evaluates the width of each square wave pulse so as to filter out erroneous pulses not eliminatd by a low pass filter.

The additional filter according to the invention consists essentially of a monostable multivibrator for producing comparison pulses having a predetermined maximum width, each comparison pulse being triggered by each square wave pulse received by the filter. The filter further includes an interlocking logic circuit which compares the width of each comparison pulse with the width of the associated square wave pulse applied to the receiver and produces an output pulse only when the widths of the pulses being compared have a certain relationship to one another.

For example, the novel filter can be constructed to emit an output pulse when the received square wave pulse is longer than the comparison pulse. This is particularly advantageous for distinguishing between the relatively long echo from the ocean bottom and shorter echoes from various submerged objects, such as schools of fish for example.

Alternatively, a filter according to the invention can be provided to produce an output pulse when the comparison pulse is of longer duration than the corresponding square wave pulse applied to the filter. A filter of this type could be used to suppress the bottom echo when it is desired to detect echo pulses from submerged objects, particularly from objects close to the ocean bottom.

It is also possible to arrange a device according to the invention so as to provide an indication of the range to objects having given minimum dimensions, as for example a ship wreck lying on the ocean bottom, which objects produce echo pulses having approximately the same duration as the originally transmitted sound pulse. To achieve this, it is desirable to distinguish such echo pulse from the relatively long bottom echo as well as from shorter extraneous pulses. In this case, the filter according to the invention can be constructed to produce a counter control signal only upon the occurrence of a square wave pulse whose duration is within a certain range, this duration being detected by means of two comparison pulses whose lengths represent the upper and lower limits of such range.

In further accordance with the present invention, the dependability of the pulse width discrimination can be increased by providing a low pass filter of the type disclosed in the above-mentioned earlier application in combination with the pulse width comparison filter according to the invention. The low pass filter performs a pulse width integration that results in the production of a pulse whenever its output signal exceeds a predetermined threshold level. This output pulse can be employed in combination with an output pulse from the pulse width comparison filter to halt the operation of the distance indicating counter. For producing the output pulses based on the output voltage of the low pass filter, a Schmitt trigger can be employed.

The combination of a pulse width comparison filter and a pulse integrating filter in parallel therewith has the added advantage of permitting the reliability of the zero sound suppression to be improved. It often occurs that the receiver of a device according to the invention will receive a high amplitude signal immediately after the emission of a sound pulse, this signal being the result of a more or less direct passage of energy from the sound pulse to the system receiver. It may occur that the amplitude of this initially received signal drops briefly below the response threshold of the receiving system before it permanently falls to the ambient noise level. The result could be a simulation of an echo pulse and could lead to an erroneous range indication if only the width of each received pulse is measured. The low pass filter, however, responds to the actual waveform of the received signal and can thus be used to maintain a zero sound block until the immediately received energy permanently falls below the response threshold of the system.

By employing a low pass filter, which integrates the square wave pulses produced in the receiver system, to control the cancellation of the zero sound block, it will occur that only after the output voltage from the integrator falls below the predetermined value, indicating that the zero, or directly transmitted, sound has actually ended, will the zero sound block be cancelled. When such cancellation is effected, a release signal is produced by the zero sound blocking device.

In further accordance with the invention, the counter is controlled by the output of an AND gate having inputs connected to the low pass filter, the release signal line of the blocking device and the pulse width comparison filter.

In order to increase the reliability of the system according to the invention, the low pass filter is preferably constructed to have a larger discharge time constant during the zero sound interval. The filter is arranged to simultaneously cancel the zero sound block and to switch to a shorter discharge time constant at the end of the zero blocking interval. This assures that the output voltage of the low pass filter will not fall below the actuation threshold of its associated pulse forming device during the zero sound interval even if the zero sound amplitude should briefly fall below the actuation threshold of the system.

The generation of comparison pulses in the monostable multivibrator of the pulse width comparison filter involves a finite time delay between the appearance of a square wave pulse and the production of the comparison pulse. In order to assure that a square wave pulse applied to the filter does not pass through a gate circuit disposed at the output of the filter before the comparison pulse has reached the value required for the comparison operation, the square wave pulse is preferably blocked until the appearance of the corresponding comparison pulse. According to the present invention, the pulse width comparison filter is provided with a double gate circuit which employs the comparison pulse itself to open the gate in order to permit the square wave pulse to be transmitted to a subsequent coincidence gate which is also connected to receive the comparison pulse.

Preferably, the comparison pulse is made to have the same width as the corresponding square wave pulse as long as the square wave pulse duration does not exceed a predetermined maximum length $\Delta T$. This assures that no comparison pulse generated by a relatively short spurious pulse will be present to prevent comparison with an immediately following useful pulse.

BRIEF DESCRIPTION OF THE DRAWINGS

FIGS. 4a, 4b and 4c are circuit diagrams illustrating portions of a modified version of the circuit of FIG. 1.

DESCRIPTION OF THE PREFERRED EMBODIMENTS

Figure 1:
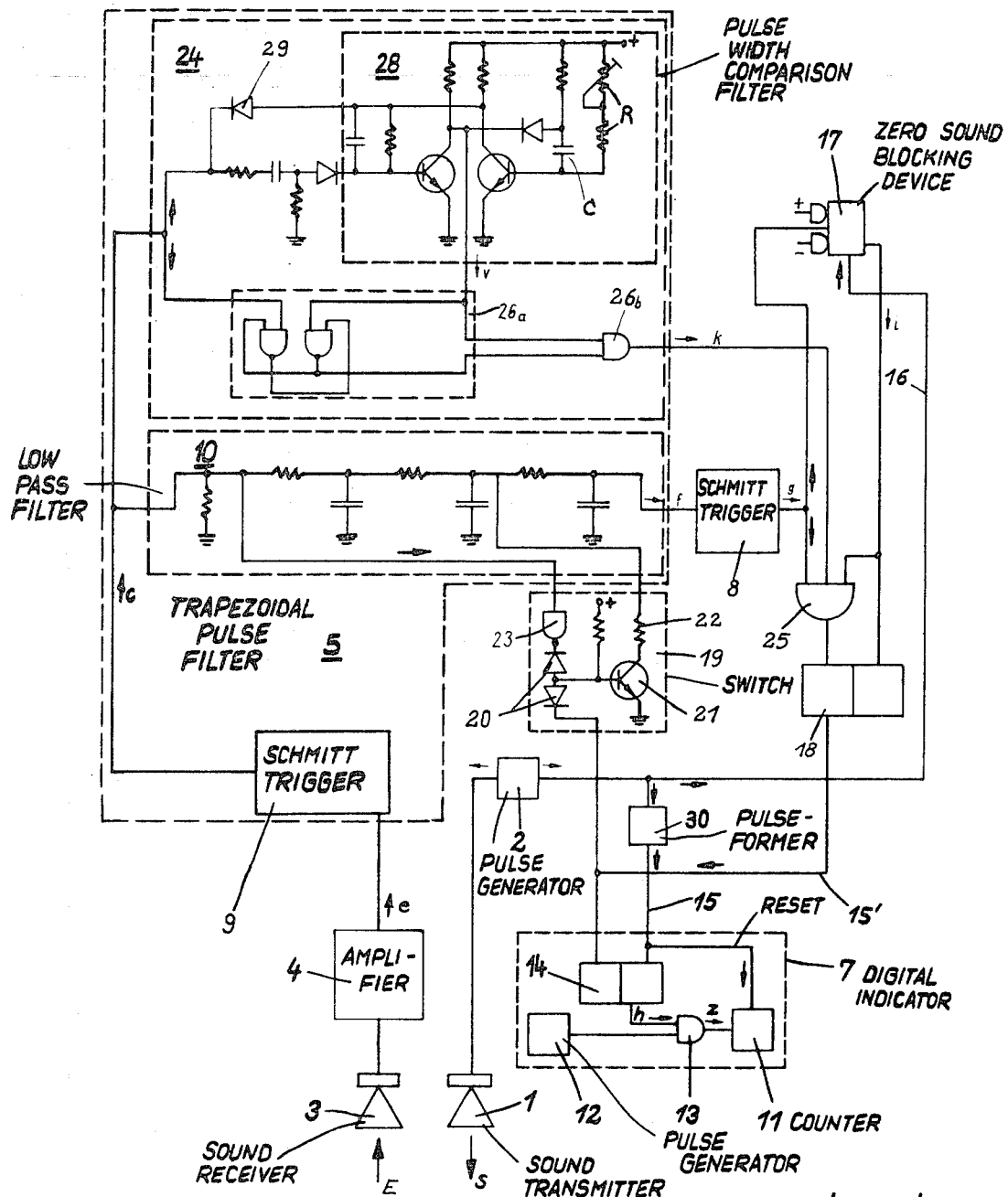
FIG. 1 is a circuit diagram, partially in block form, of a preferred embodiment of the device according to the invention.

Referring first to FIG. 1, there is shown an echo sounder arrangement whose general construction is similar to that of the circuit illustrated in FIG. 1 of application Ser. No. 767,186. The circuit units 1–5, 7–10 and 17–19 are identical with, and connected in the identical manner as, the correspondingly numbered elements illustrated in FIG. 1 of that earlier application.

The circuit essentially consists of a sound transmitter 1 directed to transmit pulses S through water and connected to a pulse generator 2. There is further provided a sound receiver 3 for receiving the echoes E returning from the reflecting surfaces encountered by the pulses emitted by transmitter 1. The output of receiver 3 is connected to an amplifier 4 whose output is connected to the input of a Schmitt trigger 9 forming a part of a combined amplitude and pulse duration filter 5 (called a trapezoidal pulse filter below). The trapezoidal pulse filter 5 additionally consists of a low pass filter 10 and a pulse width comparison filter 24 (referred to as a PWC filter below). The arrangement further includes a second Schmitt trigger 8 connected to the output of low pass filter 10, the trigger 8 constituting an amplitude filter. There is further provided a zero sound blocking device consisting essentially of a JK-flip-flop 17 and a further flip-flop 18. The circuit further includes an indicator device 7 operating as a pulse travel time counter for indicating the depth of the sea, and a switch 19 for changing the time constant of the filter 10.

The transmitter 1 is constructed to produce signal pulses S having a substantially rectangular waveform and a predetermined duration.

The circuit illustrated in FIG. 1 differs from that illustrated in the above-cited application primarily in that the trapezoidal pulse filter 5 includes, in addition to the low pass filter 10, the PWC filter 24 whose input is connected to the output of Schmitt trigger 9 in parallel with the input of low pass filter 10, and in that there is additionally provided an AND gate 25.

The two filters 10 and 24 are constructed to test the received echo pulses according to two different criteria. The filter 10 is arranged, as in the above-cited application, to function as a pulse width integrator whose time constant can be varied by the operation of switch 19 and whose output is connected to the Schmitt trigger 8, which can also be considered to be a pulse former. The discharge time constant of the filter 10 is modified by the operation of the switch 19 in dependence on the state of the JK-flip-flop 17, the output of Schmitt trigger 9 being directly connected to a negator 23 in switch 19 which reverses the polarity of the output from trigger 9 and a further flip-flop 18 being connected to have its state controlled in part by the state of flip-flop 17 and having its output connected to one of the inputs of the diode gate 20 of switch 19. The on state of switch 19 occurs when no pulse appears at the output of trigger 9, the polarity of this output being reversed by negator 23, in time coincidence with the presence of an output signal from flip-flop 18 on line 15', this state being referred to as the AND condition of the switch. When this state exists, transistor 21 is rendered conductive so that resistor 22 is effectively connected in parallel with the low pass filter 10 so as to reduce the discharge time constant of that filter.

The indicator 7, which is a digital device, includes a standard counter mechanism 11 to which counting pulses having a fixed pulse frequency are fed from a pulse generator 12 via a gate 13 whose opening is controlled by the state of one of the outputs of a flip-flop 14. Pulses are delivered to the counter 11 during the transit time of each sound pulse from transmitter 1 to receiver 3 and the output of counter 11 provides an indication of the depth of the water, which indication can be made accurate to within 10 centimeters, for example. Gate 13 is enabled when a pulse is delivered to flip-flop 14 from pulse generator 2 via a delay circuit 30 and a conductor 15, pulse generator 2 applying a pulse to delay circuit 30 in time coincidence with the delivery of a pulse to sound transmitter 1. The gate 13 is closed, or disabled, by the application of a pulse to flip-flop 14 by a second control line 15' connected to the output of flip-flop 18, such pulse appearing at the output of flip-flop 18 when a pulse is produced by the pulse width unit composed of low pass filter 10 and PWC filter 24.

The output signals $f$ from filter 10 are applied to the pulse former 8 at whose output there appears a signal $g$ which includes a pulse each time the signal $f$ exceeds a predetermined amplitude. The output of pulse former 8 is connected to the control input of flip-flop 17 and to one input of AND gate 25. The duration of each pulse in the output signal $g$ is substantially equal to the length of time during which the amplitude of the signal $f$ exceeds such predetermined value.

The flip-flop 18 is initially set by a signal from flip-flop 17 when a starting pulse is delivered from generator 2 via line 16. The flip-flop 18 is reset by an output signal from AND gate 25, such output appearing when signals are applied to the three inputs of the gate in time coincidence. When flip-flop 18 is reset, it delivers a signal via line 15' which switches flip-flop 14 so as to close gate 13, thus blocking the transmission of further pulses from generator 12 to counter 11. The counter then contains an indication of the number of pulses thus far counted.

In order to be placed in its "on" state, gate 25 must receive, in addition to a pulse from trigger 8, a signal from the output of flip-flop 17, which signal appears when that flip-flop has been reset at the end of the zero sound blocking period, and an output pulse imposed on the signal $k$ from PWC filter 24.

The filter 24 consists essentially of a device which includes a monostable multivibrator 28 and which is connected to receive the pulses $c$ from trigger 9 and to produce comparison pulses $v$ having a given pulse width $\Delta T$. Filter 24 further includes a circuit which compares the width of each comparison pulse $v$ with the width of each associated pulse $c$ from trigger 9.

In the illustrated embodiment, the pulses produced by multivibrator 28 have a negative amplitude, i.e. the amplitude of each pulse represents a binary "zero," while the amplitude of signal $v$ represents a binary "1" during the intervals between multivibrator pulses. A pulse appears in the output signal $k$ from filter 24 only when the two pulses to be compared have different widths and when the difference has a given polarity. For example, in the illustrated embodiment, a pulse will appear in the output signal $k$ only when a rectangular pulse $c$ is of longer duration than the associated comparison pulse appearing in output signal $v$.

To effect this comparison, the two signals to be compared are delivered to an interlocking logic circuit composed of a double gate circuit 26a and a coincidence gate 26b. In this logic circuit, the pulse coming directly from trigger 9 is fed to coincidence gate 26b via the double gate circuit 26a. The circuit 26a consists of two AND gates each having a negated output and serves to block the transmission of a pulse $c$ until after the initiation of the associated comparison pulse in signal $v$. This is necessary because each comparison pulse acts to block the coincidence gate 26b and, therefore, must not arrive at that gate any later than does the corresponding pulse $c$. However, a comparison pulse can not, in practice, be initiated simultaneously with the arrival of a pulse $c$ because a certain delay is involved in the triggering of such comparison pulse by the multivibrator 28. Thus, the delays involved in generating each comparison pulse are allowed for by the blocking action of circuit 26a.

The pulse former 30 shown in FIG. 1 is not of essential importance for the signal processing described in this specification; it just serves to form definite short pulses of the signals on line 16 at the beginning of each sounding period to reset counter 11 while setting flip-flop 14.

In order to assure that the comparison pulses of the signal $v$ are not of greater duration than the corresponding pulses $c$, a rectifier 29 is provided in the filter 24 and is connected with the multivibrator 28 so as to terminate the current output pulse and to restore the level of the signal $v$ to a value corresponding to a binary "1" immediately upon the termination of a pulse $c$. If the rectifier 29 were not provided, the monostable multivibrator 28 would produce, each time it has been triggered, a pulse having a fixed duration $\Delta T$, which might be of the order of 1.5 msec. The duration of each pulse produced by multivibrator 28 depends, of course, on the values of capacitor C and resistor R.

The forced termination of each comparison pulse in coincidence with the termination of its associated pulse $c$ when the pulse $c$ has a duration shorter than the normal duration of each comparison pulse is advantageous because it assures that the multivibrator 28 will be triggered by the next appearing rectangular pulse $c$ even if the multivibrator has been previously triggered by an interference pulse which appeared just before a useful pulse $c$ and which is of shorter duration than a normal comparison pulse. Such a situation might arise, for example, if some interfering object such as a large fish were in the path of the sound pulses at a depth near the ocean bottom.

When pulses appear in time coincidence in the signals $g$ and $k$, a resulting output signal will be produced by gate 25 for the duration of the coincidence of the two input pulses, for as long as a signal $i$ is also being delivered from the reset output of flip-flop 17. The appearance of an output signal from gate 25 triggers the production of a signal on line 15' and this signal acts on multivibrator 14 so as to cause its output to block gate 13 of digital indicator 7. The operation of the circuit illustrated in FIG. 1 will now be described with reference to the waveform diagrams presented in FIGS. 2 and 3.

Figure 2:
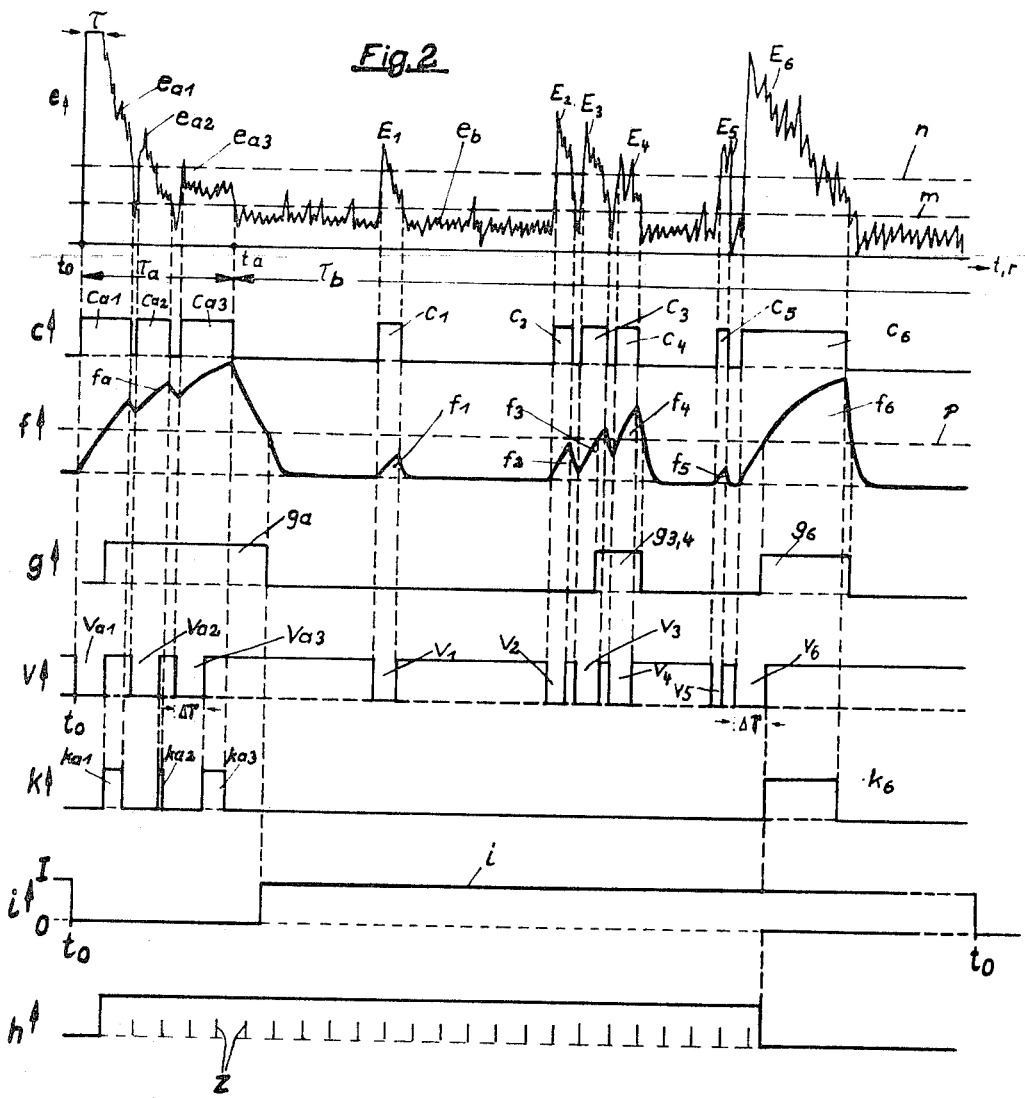
FIG. 2 is a series of waveform diagrams used in explaining the operation of the device of FIG. 1.

The topmost waveform of FIG. 2 represents the waveform of the output signal $e$ from amplifier 4 connected to sound receiver 3, this waveform, as well as the remaining waveforms, being shown as a function of travel time $t$ or the sounding range $r$. The output signal $e$ first passes through a zero sound region $\tau_a$ wherein its amplitude decreases more or less regularly, possibly in a series of steps as shown by the signal portions $e_{a1}$, $e_{a2}$ and $e_{a3}$. The received signal in this region results from the more or less direct passage of sound energy from the transmitter 1 to the receiver 3. Subsequently, the received, amplified signal $e$ passes through a region $\tau_b$ in which there exists a substantially uniform noise level $e_b$. On this noise level there are superimposed a series of pulses $E_1$, $E_2$, $E_3$, $E_4$, $E_5$ and $E_6$. These pulses exceed the average noise level $e_b$ by various amounts and are generally due to the return of echoes from various reflecting objects disposed between the sounding apparatus and the bottom of the ocean or other water body being sounded.

The amplitude as well as the shape of each of these pulses is characteristic of the nature of the associated reflecting object. For example, these pulses might be produced by schools of fish or submerged objects at various depths. The pulse $E_6$ is due to the echo of the transmitted pulse from the sea bottom.

The Schmitt trigger 9 is arranged to have a turn-on threshold $n$ and a turn-off threshold $m$, the turn-off threshold being lower than the turn-on threshold. Thus, a square wave pulse $c$ is initiated at the output of trigger 9 each time the amplitude of the signal $e$ exceeds the turn-on threshold and the pulse $c$ is terminated when the amplitude of the signal $e$ falls below the turn-off threshold. The resulting pulse train produced at the output of Schmitt trigger 9 is shown as the second waveform in FIG. 2, wherein each pulse $c$ bears the same subscript as its associated amplifier output pulse $e$ or E.

In the present example, it will be assumed that the depth of the sea bottom is to be indicated by the digital indicator 7. Therefore, it is necessary to prevent the system from responding to the pulses occurring in the zero sound region $\tau_a$, as well as the echoes $E_1$–$E_5$ due to reflecting objects located between the apparatus and the sea bottom. It is, of course, also necessary to prevent the system from responding to the more or less constant noise signal component $e_b$, this generally being accomplished by a proper selection of the turn-on threshold $n$ of Schmitt trigger 9.

It should be mentioned at this point that the waveform illustrated for the signal $e$ is assumed to be produced by an amplifier 4 which, as is common in echo sounding apparatus, is provided with a TVC and/or AVC control such that the degree of amplification of the received signals is increased in proportion to the time which has elapsed since the transmission of a sound pulse S. This type of control acts to compensate for the decrease in the amplitude of the received signals as a function of their travel distance.

The basic width of the echoes $E_1$–$E_5$ corresponds substantially to the width $\tau$ of the signal pulse S since the reflecting objects producing these echo pulses have relatively small dimensions. On the other hand, the basic width of the echo pulse $E_6$ from the ocean bttom is a multiple of the transmitted pulse width $\tau$. All of the echo pulses $E_1$–$E_5$ have a generally trapezoidal form and possess a steep leading edge, a high initial amplitude, and a final amplitude which decreases more or less rapidly to the trailing edge.

In order to produce a respresentation of the total width of each such pulse, the receiver arrangement must operate with a threshold which will be exceeded by the relatively low trailing edge of the trapezoidal pulse. It is for this reason that the trigger 9 is given a turn-off threshold $m$ which is lower than the turn-on thesfold $n$. This enables the turn-off threshold to be made relatively close to the noise level $e_b$ while assuring that this noise will not operate trigger 9.

The leading edge of each echo pulse is always quite steep, and since the echo pulse immediately reaches its peak amplitude, the trapezoidal pulse filter 5 is constructed to be actuated by the leading edge of each echo pulse whose amplitude exceeds the turn-on threshold $n$ of the Schmitt trigger 9. However, the duration of each pulse produced by the trigger 9 is determined by the time required for the amplitude of the received signal pulse to fall below the turn-off threshold $m$. In this way, the entire pulse duration between the actual leading edge and the actual trailing edge of the pulse can be employed to control the duration of each pulse $c$ produced by the Schmitt trigger 9. Such a pulse generator is well adapted to this function since, as is known, it possesses a high hysteresis in that its turn-on and turn-off threshold have substantially different values.

The received, amplified pulses $e_{a1}$, $e_{a2}$ and $e_{a3}$ appearing in the zero sound region $\tau_a$ also have a basically trapezoidal form with a steep leading edge and a progressively decreasing amplitude so that these pulses would also be detected and tested by the trapezoidal pulse filter 5. Since it is here desired to measure only the echoes from the ocean bottom, the circuit composed essentially of flip-flop 17, gate 25 and flip-flop 18 is provided for preventing the digital indicator from responding to these pulses, the manner in which this is accomplished being described in greater detail below.

At the output of the Schmitt trigger 9, there appear the square wave pulses $c$, the duration of each such pulse being determined by the duration of the corresponding pulse in the output signal $e$ from amplifier 4. The pulses $c$ are fed, in parallel, to both the low pass filter 10 and the PWC filter 24.

The low pass filter 10 acts to integrate the pulses $c$ and produces an output signal $f$ whose waveform appears in the third line of FIG. 2. The output of filter 10 is connected to a further Schmitt trigger 8 having a conduction threshold level $p$. Trigger 8 serves as a pulse former whose output waveform $g$, shown in the fourth line of FIG. 2, presents a square pulse during each period of time during which the amplitude of signal $f$ remains above the threshold level $p$.

The zero sound blocking region $\tau_a$ is, essentially, the period of time after the emission of a pulse signal S required for the amplitude of the received signal $e$ to initially fall below the turn-off threshold level $m$ of the trigger 9. However, allowance should be made for brief excursions in the amplitude of the received signal below that threshold value. When pulse generator 2 produces a pulse which is converted into a sound pulse by transmitter 1, it also applies a pulse via line 16 to multivibrator 17. This pulse acts to set the multivibrator so as to restore the release signal $i$ to a "zero" value. Thereafter, signal $i$ can return to its "1" value only in response to the appearance of the trailing edge of the next succeding output pulse $g$ from pulse former 8. As long as signal $i$ has a "zero" value, the signal applied to line 15' by bistable device 18 will have a value which maintains switch 19 in its open state, which corresponds to the long time constant state of filter 10.

This is highly advantageous because it helps to assure that the zero sound blocking device will remain effective for the actual duration of the zero sound blocking period, even if the value of the signal $e$ should fall below the lower threshold level $m$ for brief periods of time within the zero blocking region $\tau_a$. This is illustrated in the first line of FIG. 2 wherein the amplitude of the received signal $e$ has the form of three successive voltage pulses $e_{a1}$, $e_{a2}$ and $e_{a3}$ separated by brief voltage excursions below threshold level $m$.

Each of the voltage pulses in the initial portion of the received signal produces a separate wave pulse $c_{a1}$, $c_{a2}$ and $c_{a3}$, respectively, at the output of trigger 9. Since the switch 19 is at this time open as a result of the release signal $i$ having its "0" value, the low pass filter 10 has a relatively long time constant so that the output voltage $f$ from filter 10 varies relatively slowly as illustrated by the curve portion $f_a$. When output signal $f$ exceeds the threshold value $p$ of pulse former 8, a square wave pulse $g_a$ is formed. This pulse is not terminated by the brief excursions of the received signal $e$ below the threshold level $m$ because the long time constant characteristic of filter 10 assures that the amplitude of its output signal $f_a$ will remain above the threshold level $p$ of pulse former 8. As a result, the amplitude of output signal $f_a$ will remain above threshold level $p$ until a reasonable time after the actual zero blocking interval $\tau_a$ has elapsed. At the end of that interval, the amplitude of signal $f_a$ decays relatively slowly until falling below the threshold value $p$, at which time the output pulse $g_a$ from pulse former 8 terminates, thereby switching multivibrator 17 so as to bring release signal $i$ to its "1" state. When this occurs, multivibrator 18 is switched into a condition such that it applies a signal to line 15' which enables the switch 19 to be closed in the absence of subsequent square wave pulses $c$ from trigger 9. During the absence of such pulses $c$, the switch 19 will be closed so as to place filter 10 in its short time constant condition. The appearance of this signal on line 15' does not act to switch the state of flip-flop 14, so that gate 13 continues to be enabled. The state of flip-flop 14 will only be switched when the signal on line 15' reverts to its previous state.

After pulse $g_a$ once disappeared, thus setting signal $i$ in the "1" condition, this state of flip-flop 17 will be maintained until the beginning of the next sounding period is initiated (at $t_0$ in FIG. 2) by pulse generator; as already described above $i$ then is again set to its "0" value via line 16.

After the end of the zero blocking period $\tau_a$, the turn-off threshold $m$ of trigger 9 is exceeded many times by small voltage pulses in the received signal $e$. However, these pulses do not result in the production of trigger output pulses $c$ because they do not attain the turn-on threshold $n$ of the trigger 9. However, during the detecting time interval $\tau_b$, the turn-on threshold $n$ of trigger 9 is exceeded by six voltage pulses $E_1$–$E_6$. Each of these pulses results in a corresponding trigger output pulse $c_1$–$c_6$ and each of these trigger pulses in turn produces a low pass filter output pulse $f_1$–$f_6$.

However, the output pulses $f_1$, $f_2$ and $f_5$ relate to received signal pulses from small objects and do not exceed threshold $p$ so that these pulses do not produce output pulses $g$. On the other hand, the output pulses $f_3$, $f_4$ and $f_6$ do exceed threshold $p$ and result in the production of two pulses $g_{3,4}$ and $g_6$, at the output of pulse former 8. Because low pass filter output pulses $f_3$ and $f_4$ occur in such close sequence, they result in the production of but a single pulse at the output of pulse former 8. The duration of each of the pulses is generally proportional to the duration of each of the received pulses in signal $e$.

Since the termination of pulse $g_a$ causes release signal $i$ to assume a value of "1," the switch 19 will be closed, thus giving filter 10 a short time constant, whenever no pulse $c$ is present, i.e., whenever the output of negator 23 has a value of "1." On the other hand, the presence of a pulse $c$ will open switch 19 and place filter 10 in its long time constant condition. Therefore, each of the pulses $f_1$–$f_6$ will continue to have a relatively slow rise time, while having a short decay time, i.e., a steep trailing edge.

When the release signal $i$ is in its "1" state, it enables its associated input of gate 25. Similarly, each pulse $g$ from former 8 serves to enable its associated input of gate 25. As a result, it is only necessary for a pulse to appear in the output signal $k$ of PWC filter 24 in time coincidence with one of the pulses $g$ for an output to be produced by gate 25, which output switches the signal on line 15' in such a manner as to cause flip-flop 14 to close gate 13 and terminate the count being performed by counter 11. The first pulse $g_a$ occurring during the zero blocking interval $\tau_a$ can not result in the production of an output pulse by gate 25 because at this time signal $i$ has its "0" value.

PWC filter 24 has its input connected parallel with the input of filter 10 to receive the square wave pulses $c$ from Schmitt trigger 9. Each pulse $c$ applied to filter 24 triggers the generation of a negative-going comparison pulse $v$. The multi-vibrator 28 in filter 24 is constructed to give the comparison pulses $v$ a maximum duration of $\Delta T$ while the diode 29 controls the multi-vibrator 28 so as to give each comparison pulse a duration equal to the duration of the associated filter input pulse $c$ whenever the duration of pulse $c$ is less than $\Delta T$. This assures that a comparison pulse $v$ will be produced in response to each input pulse $c$ even when the input pulses are of short duration and occur in rapid sequence. The waveform of the output signal produced by multi-vibrator 28 is shown in the fifth line of FIG. 2. The comparison pulses $v_{a1}$, $v_{a2}$ and $v_{a3}$ are produced by input pulses $c$ whose duration is longer than $\Delta T$ so that the comparison pulses have their full width. However, the subsequent comparison pulses $v_1$–$v_5$ are produced by input pulses $c$ whose duration is no greater than $\Delta T$, so that these comparison pulses are terminated at the time of the termination of the corresponding input pulses $c$ and have a duration which is less than $\Delta T$. Finally, since the input pulse $c_6$ does have a duration greater than $\Delta T$, the corresponding comparison pulse $v_6$ is of maximum width and terminates before the end of input pulse $c_6$.

Each input pulse $c$ is also fed to double gate circuit 26a, as are the comparison pulses $v$. The circuit 26a is arranged to block the transmission of the input pulse $c$ at least until the initiation of the corresponding comparison pulse $v$ and to deliver an enabling pulse to coincidence gate 26b when the corresponding comparison pulse $v$ is initiated. If the comparison pulse $v$ then terminates before the termination of the input pulse $c$, both inputs of gate 26b will be activated and a pulse will be produced in the output signal $k$ from gate 26b. If the input pulse $c$ does not have a duration greater than $\Delta T$, the enabling signal from circuit 26a will terminate before, or simultaneously with, the termination of the comparison pulse so that no pulse will appear in the output signal $k$ from gate 26b.

The waveform of the output signal $k$ is shown in the sixth line of FIG. 2. As is shown therein, each of the input pulses $e_{a1}$, $e_{a2}$ and $e_{a3}$ occurring in the zero blocking region has a duration greater than $\Delta T$ and thus results in the production of a respective one of the pulses $k_{a1}$, $k_{a2}$ and $k_{a3}$. However, since the release signal has its "0" value in this region, these pulses will not operate gate 25 and hence will not alter the state of flip-flop 18 or terminate the count being performed by counter 11. The next input pulse $c$ whose duration is greater than $\Delta T$ is the pulse $c_6$ produced by the reception of the actual bottom reflection echo. This pulse result in the production of a pulse $k_6$ at the output of gate 26b. This pulse occurs in time coincidence with the output pulse $g_6$ from pulse former 8 at a time when the release signal $i$ has its "1" value. When these three signals exist simultaneously, an output signal is produced by gate 25 to switch the state of flip-flop 18. When the flip-flop 18 is thus switched, a signal is applied over line 15' to flip-flop 14 to switch the flip-flop 14 into a state in which the gating signal $h$ applied to gate 13 is terminated. As a result, the delivery of pulses from generator 12 to counter 11 is halted and the counter retains the count then reached, which count is an indication of the distance to the ocean bottom. The relation between the enabling signal $h$ and the pulse train $z$ is illustrated in the last line of FIG. 2.

Figure 3:
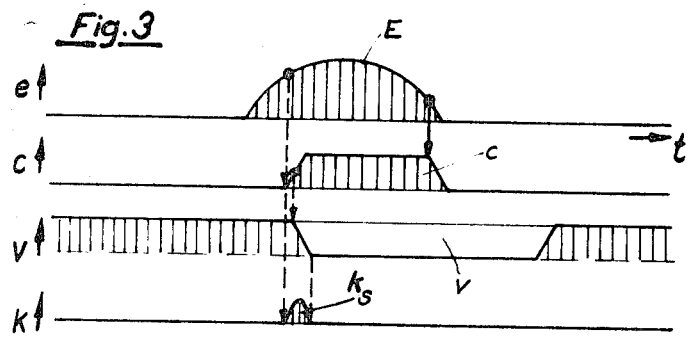
FIG. 3 is a series of waveform diagrams also used in explaining the operation of the device of FIG. 1.

FIG. 3 illustrates in greater detail the advantage of the circuit 26a of filter 24. While the pulses produced by Schmitt trigger 9 are illustrated in FIG. 4 as square wave pulses, they more accurately have a trapezoidal waveform due to the finite rise and fall times which such pulses must inevitably have. The same is true for the waveform of the comparison pulses $v$ produced by multivibrator 28. Because of the actual waveforms of these pulses, their leading edges will be slightly offset with respect to one another, as shown in the second and third lines of FIG. 3. The first line of FIG. 3 illustrates the general nature of the received echo pulse $e$ which results in the production of the trigger output pulse $c$.

If pulses $c$ and $v$ having the actual waveforms illustrated in FIG. 3 were applied directly to coincidence gate 26b, there would appear in the output signal $k$ a spurious pulse $k_s$ during the period between the beginning of the leading edge of pulse $c$ and the end of the leading edge of pulse $v$, as illustrated in the bottom line of FIG. 3, and this pulse could lead to an erroneous termination of the range count. This undesired result is prevented, according to the present invention, by the action of circuit 26a which delivers an enabling signal to gate 26b only after comparison pulse $v$ has reached its "0" value.

Referring now to FIGS. 4a, 4b and 4c, there is shown in block form, certain portions of a modified version of the circuit of FIG. 1. The modified circuit differs from that of FIG. 1 basically in that it includes two PWC filters 24 and 24$_a$, two gates 25 and 38 and two digital indicators 7 and 7' each connected to a respective one of the gates 25 and 38. This arrangement is provided to permit the system to produce two independent indications, one representing the range to the ocean bottom and the other representing the range to an object which is above the ocean bottom and which produces a received signal pulse whose duration exceeds a predetermined value while not being as long as the bottom echo pulse. For example, the additional reflection pulse to be detected preferably has a duration which corresponds substantially to the duration $\tau$ of the transmitted signal pulse.

FIG. 4a shows a train of three pulses $c_{10}$, $c_{11}$ and $c_{12}$ produced by Schmitt trigger 9 in response to the signal received from amplifier 4. The pulse $c_{12}$ is of a length which corresponds to an echo received from the ocean bottom, while the pulse $c_{10}$ corresponds to the echo received from a submerged object whose range is to be additionally measured. There also appears a short pulse $c_{11}$ whose length is not sufficient to satisfy either of the specified detection criteria.

To filter out the desired rectangular pulse $c_{12}$ from the other received pulses, the lower pass filter 10 is provided. To filter out the pulse $c_{10}$ there is provided a combined PWC filter which consists of two filters 24 and 24$a$ connected in parallel and having their outputs $k$ and $k_a$ connected to the inputs of an AND gate 38.

Filter 24 is constructed and adjusted so that a pulse appears in its output signal $k$ in response to each pulse $c$ of longer duration than the corresponding comparison pulse $v$. However, in this case, the length of each comparison pulse is made substantially small than the duration $\tau$ of the transmitted pulse, rather than longer than $\tau$, as in the case of the embodiment of FIG. 1. Thus, at the output of filter 24 there will appear two pulses $k_{10}$ and $k_{12}$ in response to the input pulses $c_{10}$ and $c_{12}$.

The filter 24$a$, on the other hand, is constructed and adjusted to produce longer comparison pulses $v_{10a}$, $v_{11a}$ and $v_{12a}$ and to present a pulse in its output signal $k_a$ in response to each input pulse $c$ of shorter duration than its associated comparison pulse. The filter 24$a$ could easily be arranged to perform this function simply by, for example, interchanging the connections for the signals $c$ and $v$ and reversing the polarities with which these signals are applied. Filter 24$a$ thus produces an output pulse $k_{10a}$ in response to input pulse $c_{10}$ and a pulse $k_{11a}$ in response to input pulse $c_{11}$. In the subsequent AND gate 38, a count termination signal is produced only upon the occurrence of the input pulse $c_{10}$ because it is only this input pulse which results in an output pulse in both of the outputs $k$ and $k_a$.

However, as is to be seen out of FIG. 4b, the pulse $k_{10a}$ cannot appear before pulse $k_{10}$ disappears. That is why there is to be provided for an additional delay circuit 39, as shown in FIG. 4c, e.g. a conventional monostable multivibrator, being initiated by the trailing edge of pulse $k_{10}$ and thus enlarging this one for about a time given by the difference between the length of the pulses $v_{10}$ and $v_{10a}$.

It will be understood that the above description of the present invention is susceptible to various modifications, changes and adaptations.

What is claimed is:

1. In a device for receiving echo sounding pulses and for providing an indication of the distance to a selected reflecting object, which device includes pulse generator means connected to receive a representation of the received echo signal and to produce, in response to each received echo pulse whose range-corrected amplitude exceeds a predetermined value, a substantially square wave pulse whose duration is substantially equal to the duration of the received pulse, and counter means for providing an indication of the distance to such object, the improvement comprising pulse width comparison filter means connected to receive such square wave pulses for producing a counter control signal upon receipt of a square wave pulse whose duration bears a predetermined relation to a given reference value.

2. An arrangement as defined in claim 1 wherein said comparison filter means comprise: a monostable multivibrator connected to receive such square wave pulses for producing a comparison pulse having a given maximum duration in response to each such square wave pulse; and interlocking logic circuit means connected to receive such square wave pulses and to receive said comparison pulses for comparing the length of each said comparison pulse with the length of its corresponding square wave pulse and for producing a comparison output pulse only when a predetermined duration relationship exists between said comparison pulse and its corresponding square wave pulse.

3. An arrangement as defined in claim 2 wherein said comparison filter means are arranged for producing a comparison output pulse only when the duration of a square wave pulse is longer than that of its associated comparison pulse.

4. An arrangement as defined in claim 2 wherein said comparison filter means are arranged for producing a comparison output pulse only when the duration of a comparison pulse is longer than that of its corresponding square wave pulse.

5. An arrangement as defined in claim 2 wherein said logic circuit is arranged to block the received square wave pulse until its corresponding comparison pulse has been initiated.

6. An arrangement as defined in claim 5 wherein said logic circuit includes a double gate circuit connected to block the square wave pulse and to receive the comparison pulse for causing the comparison pulse itself to open said gate for the passage of the square wave pulse.

7. An arrangement as defined in claim 2 wherein said monostable multivibrator is arranged to produce a comparison pulse whose duration does not exceed that of its corresponding square wave pulse.

8. An arrangement as defined in claim 1 wherein said comparison filter means are arranged for producing a counter control signal upon receipt of a square wave pulse whose duration is between predetermined upper and lower limits, said filter means being arranged for producing, in response to each square wave pulse, a first comparison pulse whose duration is equal to such lower duration limit and a second comparison pulse whose duration is equal to such upper duration limit.

9. An arrangement as defined in claim 1 further comprising a zero sound blocking device for producing a release signal when the signal received by said device initially falls below a predetermined level, a low pass filter connected to receive such square wave pulses and to produce output pulses representative of such square wave pulses, and gate means having a first input connected to receive said release signal, a second input connected to receive said counter control signal, and a third input connected to receive the output pulses from said low pass filter, said gate means further including an output connected to the counter means for applying a count termination signal thereto when signals are present in time coincidence at all three of its said inputs.

References Cited

UNITED STATES PATENTS 3,416,127  12/1968  Menin et al. _____ 340—3
3,437,986  4/1969  Noble _____ 340—3

RICHARD A. FARLEY, Primary Examiner

U.S. Cl. X.R.

343—13